March 30, 1926.  J. W. MIJNSSEN ET AL  1,578,746
WHEEL FOR AUTOMOBILES AND THE LIKE
Filed Oct. 26, 1921
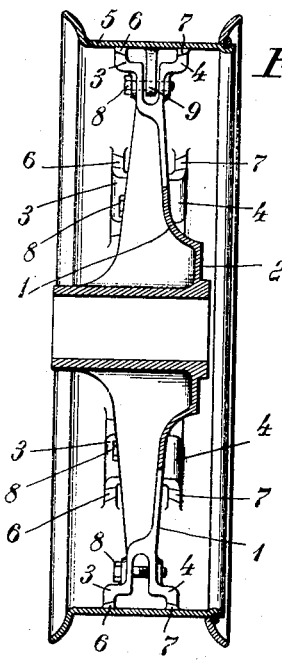
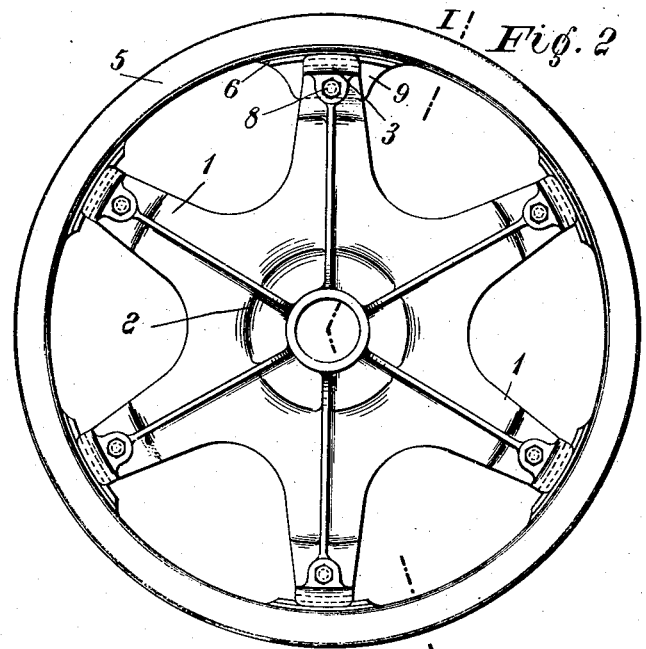
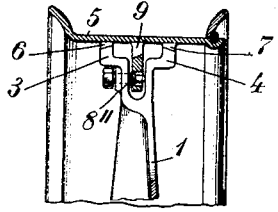
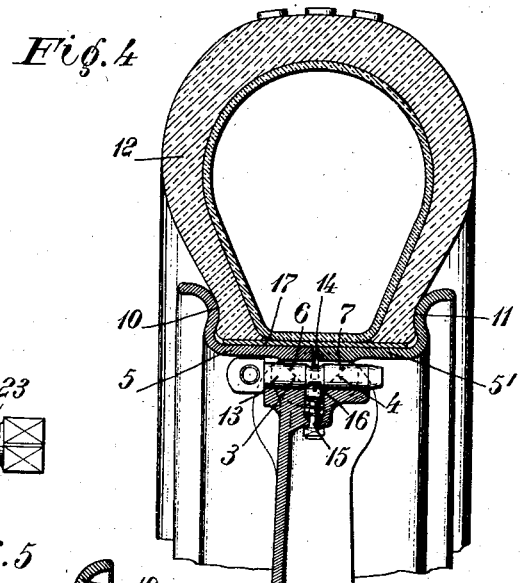
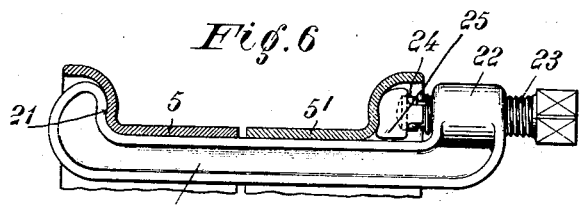
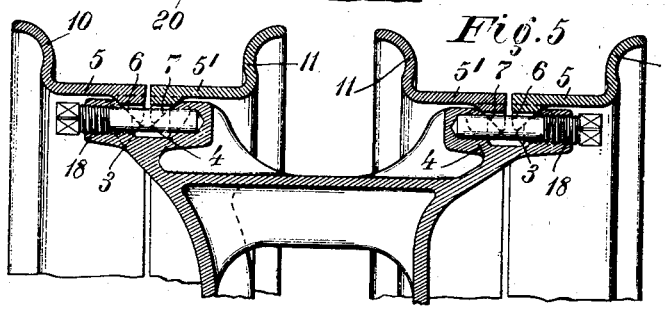
Inventors:
Jacob Willem Mijnssen,
Karl Künzi.
By
Atty Patented Mar. 30, 1926.

1,578,746

UNITED STATES PATENT OFFICE.

JACOB WILLEM MIJNSSEN AND KARL KÜNZI, OF SCHAFFHAUSEN, SWITZERLAND, ASSIGNORS TO AKTIENGESELLSCHAFT DER EISEN- UND STAHLWERKE VORM. GEORG FISCHER, OF SCHAFFHAUSEN, SWITZERLAND.

WHEEL FOR AUTOMOBILES AND THE LIKE.

Application filed October 26, 1921. Serial No. 510,618.

*To all whom it may concern:*

Be it known that we, JACOB WILLEM MIJNSSEN, a subject of the Queen of Netherlands, residing at Schaffhausen, Switzerland, and KARL KÜNZI, a citizen of the Republic of Switzerland, residing at Schaffhausen, Switzerland, have invented certain new and useful Improvements in Wheels for Automobiles and the like; and we hereby declare the following to be a clear, full, and exact description of the invention, such as will enable others skilled in the art to which it appertains to make and use the same, reference being had to the accompanying drawings, and to letters or figures of reference marked thereon, which form a part of this specification.

The present invention relates to improvements in wheels for automobiles and the like and particularly to wheels with a wheel spider and an exchangeable rim.

With known constructions of this type the connection between wheel spider and rim is, as a rule, effected by means of screws passing through the ends of the spokes and through a flange of the rim, or parts of a flange arranged in one plane at right angles to the axis. With such wheels exchanging the rim necessitates unscrewing all the screw nuts which have to be screwed on again in order to fix the new rim, an operation that takes up a considerable amount of time. Further the above mentioned flange or the parts of the flange arranged in one plane must be amply dimensioned in order to withstand the occurring strains and the base of the rim has to be strongly built for the same reasons, whereby the weight of the wheel is materially increased.

In contradistinction to said known constructions the feature of the object of the present invention is a wheel spider in which the ends of the spokes are bifurcated and are provided at their extreme ends with faces forming parts of the periphery of two rings and serving as supports to the rim, and by a rim the inner periphery of which is provided with at least one row of projecting members or lugs extending inwardly in a radial direction, the supporting faces of the bifurcated spokes and said radial extensions on the rim being in frictional engagement. This construction enables reduction of the weight of the wheel and of the rim respectively and the establishment of a readily detachable connection between wheel spider and rim.

Several modes of carrying the invention into effect are shown by way of example on the accompanying drawings in which:

Fig. 1 is a cross-section along line I—I of Fig. 2 through a wheel spider and rim and Fig. 2 shows an elevation view of a first constructional example;

Fig. 3 is a cross-section through wheel spider and rim according to a second constructional example;

Fig. 4 illustrates a third constructional form of the wheel on an enlarged scale, the rim and the spoke end being shown in section;

Fig. 5 is a further constructional example of a wheel with two rims shown in section through rims and spoke;

Fig. 6 illustrates in detail a tool used for mounting a circumferentially split rim to the wheel spider.

Referring to the constructional example illustrated in Figs. 1 and 2 the free ends of the spokes 1 of the wheel spider 2 are bifurcated and the faces 3 and 4 respectively being provided at the extreme end of each shank of the bifurcation shaped to form part of a ring surface, in this special case of the internal or concave surface of a cone. The faces 3 and 4 of all the spokes are arranged on two annular rows and the faces 3 of one row are at an angle to the faces 4 of the other row, the apex of the angle pointing towards the axis of the wheel. At the inner periphery of the rim 5 and permanently and rigidly fixed thereto there are provided projecting members 6 and 7 arranged in two annular rows and extending in the radial direction to a comparatively small height. The inner faces of said members are shaped to form parts of the convex surface of cones. The faces 3 and 4 of the bifurcated ends of the spokes and the faces of said members 6 and 7 are in contact so that the former act as supporting faces to the rim. The inclination of the faces is such that only a comparatively slight relative axial movement of one pair of faces in respect to the other is necessary to effect proper operative engagement and the rigid supporting of the rim. This comparatively steep inclination also prevents any liability of the faces becoming so tightly wedged under the strains of service as to render difficult the separation of the faces when it is desired to remove the tire. The faces act primarily as centering faces, and are disposed as close as possible to the inner surface of the rim so that twisting or lateral strains on the tire act with comparatively slight leverage on the engaging faces. The bifurcation extends to a greater radial depth than the radial height of the members or lugs 6 and 7 and the shanks of the bifurcated ends are passed by set screws 8 arranged at a distance from the extreme ends of the spokes so as to clear the lugs 6 and 7. Upon a tightening of the set screws 8 a pressure between the said contacting faces and thereby a frictional engagement between wheel spider 2 and rim 5 is caused.

In order to provide for a connection, in addition to said frictional engagement, that is rigid with regard to forces acting in the circumferential direction for the purpose of preventing the wheel spider from creeping in the rim, a lug 9 may be provided at the inner periphery of the rim that extends to a greater extent in the radial direction than the members 6 and 7, which lug is provided with a bore through which one of the set screws (designated with 8') passes. It is evident that any other suitable additional rigid joint might be made use of.

In order to exchange the rim of the wheel illustrated in Figs. 1 and 2 it is only necessary to remove the set screw 8' and to loosen the other set screws 8 whereupon the rim 5 can be turned relatively to the wheel spider until the ends of the spokes are out of engagement with the members 6 and 7, in this position the rim can be freely taken off the wheel spider.

The constructional example illustrated in Fig. 3 differs from the above described example inasmuch as the inclination of the contacting faces 3, 4 of the bifurcated spoke ends and of the members 6, 7 of the rim is reversed, i. e. the apex of the angle which the faces of one row of faces form with the faces of the other row points towards the periphery of the wheel. Instead of the set screws 8 a pressure screw 8" serves as the means for causing a pressure and thereby a frictional engagement between said contacting faces of wheel spider and rim. The additional rigid connection between wheel spider and rim is similar to said described in the first constructional example of the wheel, a lug 9 being provided through a bore of which one of the pressure screws 8" passes.

In the constructional example illustrated in Fig. 4 a rim is shown that is subdivided along its circumference in the middle of the base of the rim. Each of the two rim halves 5 and 5' is provided at its inner periphery with members 6 and 7 respectively arranged in annular rows, which are shaped to form parts of the internal surface of a cone in a similar manner to that shown in the constructional example illustrated in Figs. 1 and 2. The inner faces of the members 6 and 7 are in contact with the faces 3 and 4 of the spoke ends. In order to cause the frictional engagement between said contacting faces the pressure of the inflated pneumatic 12 is transmitted to the rim at its lateral edges 10, 11 and presses the two rim halves asunder whereby the pressure on the contacting surfaces is obtained. The means for effecting the additional rigid joint between rim and the wheel spider differ from that disclosed in the constructional examples according to Figs. 1, 2 and 3. In this case a cylindrical bolt 13 passes transversely through the contracting faces and locks the latter against a relative displacement in the circumferential direction. In order to secure the bolt 13 in position the latter is provided with a circular groove 14 with which a spring loaded pin 15 coacts. The rounded head 16 of said pin allowing of an easy displacement of said bolt. 17 denotes a cylindrical ring surrounding the base of the two rim halves and serving to hold said two halves in alignment and to prevent the air tube or the pneumatic from getting jammed in between the two rim halves.

The constructional form of the wheel shown in Fig. 5 shows the adaptation of the above described connection between wheel spider and rim to a wheel fitted with double pneumatics. The details of the connection are similar to that shown in Fig. 4 with the exception of the means for preventing the creeping of the wheel spider in the rim consisting in this case of set screws 18 passing through the contacting faces in lieu of the bolt 13 shown in Fig. 4.

Fig. 6 is illustrative of a device used for mounting the rim consisting of two halves and provided with the means for effecting the frictional engagement between wheel spider and rim on the wheel spider. The device consists of a screw clamp, the body 20 of which being formed at its one end 21 in conformity with the outer shape of the lateral part of the rim half 5, the other end forming a tapped eye 22 through which a pressure screw 23 passes. The inner end of the pressure screw 23 acts upon a piece 24 bearing against the lateral part of the other rim half 5'. The pneumatic can be mounted on the two rim halves and the distance between the two rim halves 5 and 5' and between the facings of the members 6 and 7 can be readily adjusted by actuating the screw 23 thus facilitating the mounting of an exchanged rim. In comparison with known means for holding the rim halves together when the rim is to be mounted on the wheel spider the described device does away with the known means forming integral parts of the rim and contributes thus in decreasing the weight of a wheel.

It will be noted that the peripheral extent of the faces 3, 4 and 6, 7 need not be as great as the peripheral extent of the spaces between the ends of the spokes, and that by reason of having no felloe or other rim permanently fastened to the ends of the spokes there will be no interference with the inflating valve in placing the tire, or removing it from the wheel spider.

The tire and the rims can be moved onto the wheel spider without having to tilt the tire with respect to the plane of the wheel for the purpose of first placing the tire valve through the rim slot, or equivalent, and then by an arcuate movement with the valve as a center swing the tire onto the wheel.

In our construction the inflating valve offers no obstacle whatever in placing the tire on the wheel, and no special provisions for this purpose are required.

We claim:

1. A wheel for automobiles and the like comprising in combination, a wheel spider having a plurality of spokes each spoke having two faces on its peripheral surface shaped to form parts of the convex surfaces of cones, a rim divided in the plane of the wheel, radially projecting members on the inner periphery of both of said rim halves, each member having a face forming part of the interior concave surface of a cone, each such face contacting with a corresponding face of the spoke ends, a pneumatic tire mounted on said rim, the distance in the axial direction between said faces on the rim halves being alterable and said contacting faces being pressed against each other by the air pressure in the inflated tire, whereby a frictional engagement between wheel spider and rim is caused and a connection between the latter is effected that can readily be severed, a locking bolt passing through the contacting faces of the wheel spider and rim for preventing the wheel spider from creeping on the rim when the air pressure in the tire fails, said locking bolt having a circular groove, and a spring-loaded pin engaging in said circular groove for keeping said bolt in position.

2. A vehicle wheel including a wheel spider having a plurality of spokes each having reversely inclined centering faces on the peripheral surface of its end, the spokes at their outer ends and said faces being circumferentially spaced to a greater distance than the circumferential length of said faces, and the spokes being connected together only at their inner ends, a tire carrying rim including two circular portions each having an annular row of projections permanently and rigidly fixed thereto, and extending inward radially to a comparatively slight extent, said rows of projections having inclined centering faces adapted to engage with the centering faces of said spokes upon a direct axial movement of the rim with the rim faces between the spokes and a circumferential movement of the rim to bring the rim faces opposite the ends of the spokes, a locking bolt passing through the centering faces of the wheel spider and rim portions for preventing the creeping of the rim, said locking bolt having a groove intermediate of its ends and a spring pressed pin engaging in said groove for normally preventing endwise movement of said locking bolt.

3. A vehicle wheel including a wheel spider having a plurality of spokes each having reversely inclined centering faces on the peripheral surface of its end, the spokes at their outer ends and said faces being circumferentially spaced to a greater distance than the circumferential length of said faces, and the spokes being connected together only at their inner ends, a tire carrying rim including two circular portions each having an annular row of projections permanently and rigidly fixed thereto, and extending inward radially to a comparatively slight extent, said rows of projections having inclined centering faces adapted to engage with the centering faces of said spokes upon a direct axial movement of the rim with the rim faces between the spokes and a circumferential movement of the rim to bring the rim faces opposite the ends of the spokes, and a locking bolt passing through the centering faces of the wheel spider and rim portions for preventing the creeping of the rim.

4. A vehicle wheel including a wheel spider having a plurality of spokes each having reversely inclined centering faces on the peripheral surface of its end, the spokes at their outer ends and said faces being circumferentially spaced to a greater distance than the circumferential length of said faces, and the spokes being connected together only at their inner ends, a tire carrying rim including two circular portions each having an annular row of projections permanently and rigidly fixed thereto and extending inward radially to a comparatively slight extent, said rows of projections having inclined centering faces adapted to engage with the centering faces of said spokes upon a direct axial movement of the rim with the rim faces between the spokes, and a circumferential movement of the rim to bring the rim faces opposite the ends of the spokes, and separate means for normally preventing relative circumferential movement of the wheel and rim.

5. A vehicle wheel including a wheel spider having a plurality of spokes each having reversely inclined centering faces on the peripheral surface of its end, the spokes at their outer ends and said faces being circumferentially spaced to a greater distance than the circumferential length of said faces, and the spokes being connected together only at their inner ends, a tire carrying rim including two relatively movable circular portions each having permanently and rigidly fixed to the inner surface thereof an annular row of projections corresponding in number to the number of said spokes, and adapted to engage with said centering faces and to be held against said faces by the pressure of the resilient tire, and means independent of said faces and projections for preventing creeping of the rim.

6. A vehicle wheel including a wheel spider having a plurality of spokes each having centering faces on the peripheral surface of its end, the spokes at their outer ends and said faces being circumferentially spaced to a greater distance than the circumferential length of said faces, and the spokes being connected together only at their inner ends, and a tire carrying rim including two relatively movable circular portions each having permanently and rigidly fixed to the inner surface thereof an annular row of projections corresponding in number to the number of said spokes, and adapted to engage with said centering faces, and limit the separation of said rim portions under the action of the expansion pressure of the tire when the rim is in position on the wheel.

7. A vehicle wheel including a wheel spider having a plurality of spokes each having reversely inclined centering faces on the peripheral surface of its end, the spokes at their outer ends and said faces being circumferentially spaced to a greater distance than the circumferential length of said faces, and the spokes being connected together only at their inner ends, a rim adapted to carry a resilient tire and having two annular rows of inwardly extending, permanently and rigidly fixed projections each having a centering face adapted to engage with a corresponding one of the first mentioned centering faces, the number of projections in each row corresponding to the number of spokes, and the circumferential length of said projections being less than the distance between the outer ends of adjacent spokes, the clamping of the rim being effected by a relative axial movement of one row of faces in respect to another, and means for preventing creeping movement of the rim.

8. A vehicle wheel including a wheel spider having a plurality of spokes each having reversely inclined centering faces on the peripheral surface of its end, the spokes at their outer ends and said faces being circumferentially spaced to a greater distance than the circumferential length of said faces, and the spokes being connected together only at their inner ends, and a rim adapted to carry a tire and having two annular rows of inwardly extending, permanently and rigidly fixed projections each having a centering face adapted to engage with a corresponding one of the first mentioned centering faces, the number of projections in each row corresponding to the number of spokes, and the circumferential length of said projections being less than the distance between the outer ends of adjacent spokes, the inclination of said faces being comparatively steep, whereby clamping action is effected upon comparatively slight relative axial movement of the faces.

In testimony that we claim the foregoing as our invention, we have signed our names.

JACOB WILLEM MIJNSSEN.
KARL KÜNZI.